(12) United States Patent
Lutnaes

(10) Patent No.: US 6,901,273 B2
(45) Date of Patent: May 31, 2005

(54) METHOD AND SYSTEM FOR CONTROLLING THE SUPPLY OF POWER TO A MOBILE PHONE

(75) Inventor: Sturla Lutnaes, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 661 days.

(21) Appl. No.: 09/855,432

(22) Filed: May 14, 2001

(65) Prior Publication Data

US 2001/0053707 A1 Dec. 20, 2001

(30) Foreign Application Priority Data

May 15, 2000 (SE) .............................................. 0001771

(51) Int. Cl.[7] .............................................. H04M 1/00
(52) U.S. Cl. ...................... 455/566; 455/90; 455/572; 455/128
(58) Field of Search .............................. 455/566, 550.1, 455/572; 345/173, 174; 178/18.01, 18.03, 18.05, 18.06

(56) References Cited

U.S. PATENT DOCUMENTS

| 5,553,296 A | | 9/1996 | Forrest et al. .............. 395/750 |
|---|---|---|---|
| 5,742,894 A | | 4/1998 | Jambhekar et al. ........... 455/90 |
| 5,790,875 A | * | 8/1998 | Andersin et al. ............ 713/320 |
| 6,058,485 A | * | 5/2000 | Koziuk et al. .............. 713/320 |
| 6,091,031 A | * | 7/2000 | Lee et al. ................ 178/18.01 |
| 6,424,844 B1 | * | 7/2002 | Lundqvist ................... 455/566 |
| 6,476,797 B1 | * | 11/2002 | Kurihara et al. ............ 345/173 |

FOREIGN PATENT DOCUMENTS

| EP | 0 859 498 A2 | 8/1998 |
|---|---|---|
| GB | 2 294 139 A | 4/1996 |
| SE | 9803960-5 | 5/2000 |
| WO | WO 99/37077 | 7/1999 |

OTHER PUBLICATIONS

International–Type Search Report Completed by ISA/SE on Mar. 30, 2001, as pertaining to National Application No. SE 0001771–5 filed on May 15, 2000.

* cited by examiner

Primary Examiner—Lester G. Kincaid
Assistant Examiner—Doan Phuoc
(74) Attorney, Agent, or Firm—Jenkens & Gilchrist, P.C.

(57) ABSTRACT

The present invention relates to a portable telephone, which can be switched on/off by using the touch screen of the portable phone.

6 Claims, 2 Drawing Sheets

METHOD AND SYSTEM FOR CONTROLLING THE SUPPLY OF POWER TO A MOBILE PHONE

TECHNICAL FIELD

The present invention relates to controlling the supply of power to a portable phone of the type mentioned in the preamble of the independent claims.

STATE OF THE ART

Many portable communication devices, such as mobile phones, personal communicators etc, normally require a "hardware power on system" for powering on. A "hardware power on system" is referred to as a system, which comprises a physical switch, controlling the power on function of the portable phone.

Other portable communication devices have a hinged front panel, a so-called flip, which can be opened when the device is used for certain functions and which can be closed in order to reduce the bulk of the device when these functions are not required.

One example of such a device is the mobile phone known from GB-A-2 297 661, which describes a flip which can be folded down to expose a touch screen display. When the flip is folded up against the touch screen display, the touch screen display can be operated by means of a keypad consisting of a plurality of buttons, which extend through the flip and which can be pressed by a user into contact with the touch sensitive parts of the touch screen display. There is a flip position-indicating switch in the main body of the unit, which can be operated by a switch activation device disposed in the flip. The flip position indicating switch and switch activation device co-operate to produce a mode change signal which is sent to a processor of the mobile phone and which indicates whether the flip is open or closed. If the flip is closed, a first set of functions is available to the user and if the flip is open, a second set of functions is available to the user. Mobile phones of this type can be switched on and off by means of a hardware switch, which disconnects the processor from the logic voltage supply in order to minimise unnecessary battery drainage caused by the logic voltage supply leaking current.

Thus, a separate hardware switch is required, which increases the manufacturing costs and, as it introduces a potential failure path, also lowers the reliability of the mobile phone.

It is also known to use "soft power control" for instance in personal computer systems, to be able to save power and extend battery lifetime. This is ordinarily done by the operator of the computer system without using a "hard power on switch" for powering on. "Soft power control" in such a computer system normally comprises several power control modes, such as a "full power" mode and a "sleep" mode. In the "full power" mode, the main parts of the computer system are supplied with power and are active. In the "sleep" mode, one or more parts of the computer system are not supplied with power and are said to be inactive. In the "sleep" mode, the operator can depress a key on the keyboard to power on the main parts of the computer system.

It is known from U.S. Pat. No. 5,553,296 to use a touch screen for a power control function in a computer system, whereby the touch screen is employed to control a number of power modes, such as a "full power" mode and a "sleep" mode. The touch screen detects a touch input by the operator from the touch screen. If the computer system is in a power down mode, a so-called "sleep" mode, the touch screen provides a main power-on signal after the touch input is detected, by means of a control means controlling a voltage regulator arranged to power on the computer by connecting to a power supply.

U.S. Pat. No. 4,825,209 describes a remote control apparatus, which puts a transmitting portion, a receiving portion and an image display control portion thereof in an enabled state for a predetermined period of time after a touch panel is pressed to be able to reduce power consumption. The press detection is done with push button switches in the corners of a remote control.

In Swedish patent application SE 9803960-5 an enhanced power-on function is described, wherein hard switches to be implemented in a portable communication device are not required, and also if comprising a flip provided with a flip hinge, it does not have to be provided with wires through the flip hinge. A touch-screen provided on a LCD is able to detect keystrokes from a push-through keyboard covering parts of, or the entire LCD. If the mobile phone should be powered up by pressing an on button in the keyboard, the power up detection can be performed by means of the touch-screen.

However, there still remain problems to be solved. For instance, if the communication device is left in a pocket of a shirt or in a purse, spurious starts of the device can occur, if the touch-screen is pressed by accident. This may lead to significant power drainage of the battery.

SUMMARY OF THE INVENTION

The object of the invention is to solve the described problems and provide a portable phone, in which power drainage by pressing the touch-screen by accident is avoided. Herein, the term "portable phones" comprises: mobile telephones, cordless telephones and personal communicators.

This is attained according to the present invention by means of a portable phone, in which the touch screen display is used for switching on the device, wherein a hardware switch is not necessary. The touch screen display comprises at least one inner and one outer essentially transparent, conducting plate, which are movable in relation to each other between a first position, in which the plates are spaced apart, and a second position, in which the plates are contacted to each other by the outer plate being depressed by a user of the portable phone by means of an input means, such as a key-pad, or by direct activation providing a pressure against the touch screen display, wherein a voltage controlled switch comprising a control block, is connected to said plates and arranged to turn on the power of the portable phone upon receipt of a signal indicating that a power-on key or a power-on area has been depressed by the user, after an initial detection of the pressed position on the touch screen, verifying a "valid" input.

According to a preferred embodiment of the invention this is attained by a portable phone comprising at least one touch screen display and at least one power supply, said touch screen display comprising at least one inner and one outer essentially transparent, conducting plate, which are movable in relation to each other between a first position, in which the plates are spaced apart, and a second position, in which the plates are contacted to each other by the outer plate being depressed by a user of the portable telephone by means of an input means, such as a keypad, or direct activation providing a pressure against the touch screen display, wherein a voltage controlled switch connected to said plates is adapted to turn on the power of the portable phone upon receipt of a signal indicating that a power-on key or a power-on area has been depressed by the user, characterised in that a control block connected to the voltage controlled switch is arranged to perform an initial detection and evaluation whether it is a valid pressed position on the touch-screen display before powering-on the phone.

In this way, accidentally pressing the touch-screen in positions away from the ON-button will not start the logic.

Preferably, the control block is arranged to detect whether the touch position lies within an area defined by four co-ordinates or less (MAX X, MIN X, MAX Y, MIN Y) defining the maximal area of an on-button of the input-means, or possibly whether it lies within any of the areas of two or more buttons or within the combined area of ajoining on-buttons.

If a higher security against involuntary switch-on is desired it is possible to arrange two on-buttons to be depressed in sequence. In this case the control block is arranged to detect whether of two sequential touch positions one lies within one of two areas and the second within the other of the two areas, each defined by four co-ordinates or less defining the maximal area of a corresponding on-button of the input-means.

Preferably, the voltage controlled switch comprises control means provided with always-on low frequency (LF) generator means adapted to perform said detection and evaluation.

Another advantage of the present invention is that the invention simplifies the use of a portable phone, compared to prior art.

An additional advantage of the present invention is that no additional switch need be incorporated in the portable phone. Therefore, it is possible to use the display of a portable phone for powering on.

The invention will now be described in more detail with reference to preferred embodiments thereof and to the appended drawings.

DETAILED DESCRIPTION OF THE EMBODIMENTS

Figure 1:
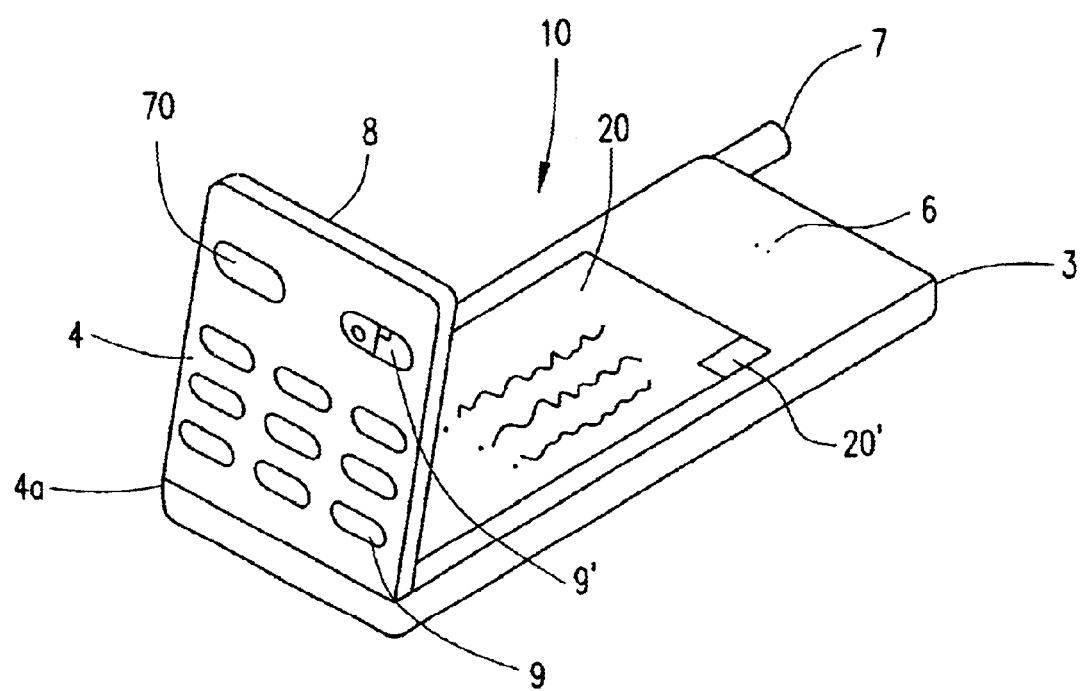
FIG. 1 shows a perspective view of a portable phone, according to the invention.

FIG. 1 shows a perspective view of an embodiment of a portable phone 10 according to the invention. The portable phone 10 is provided with a touch screen display 20 for displaying information such as telephone number(s), signal strength, battery level, roaming information etc, and intended for receiving commands from a user in a conventional way, as well as the inventive power-on function. The portable phone 10 has a main body 3, comprising a loud-speaker 6, an antenna 7, a microphone 8, and a flip 4, attached to the main body 3 by means of a flip hinge 4a, and movable in relation to the main body 3, which flip 4 can be folded up against the main body 3. The flip 4 has input means 70, for example a keypad having a plurality of keys 9, where each key 9 corresponds to a desired function. The function of each key 9 can be determined by the software of the portable phone 10. The touch screen display 20 detects which key 9 has been pushed and carries out the desired function. Activating the power-on key 9' causes the touch screen display 20 to register that the key 9' has been pushed and causes a voltage controlled switch to connect to the power supply (not shown).

To illustrate the invention, the voltage-controlled switch 2 will now be described, with reference to FIG. 2.

Figure 2:
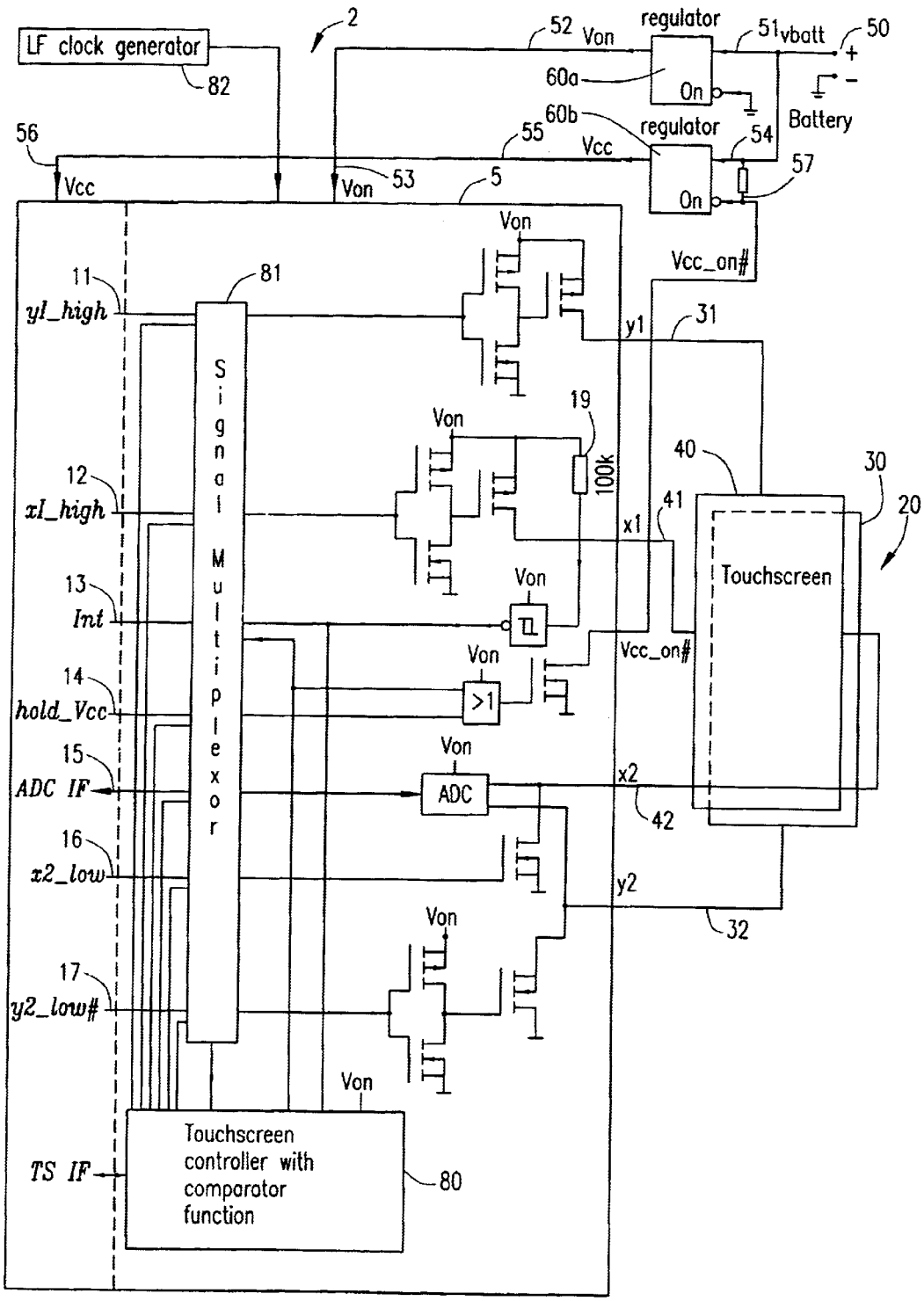
FIG. 2 shows a schematic block diagram of the touch screen display and the voltage controlled switch, comprising a control block, of the portable phone illustrated in FIG. 1.

FIG. 2 is a schematic block diagram of the touch screen display 20 connected to the voltage controlled switch 2 for connecting and disconnecting the power supply 50 to the portable phone (not shown). The power supply 50 is connected to an input terminal 51 of a first voltage regulator 60a, which can provide a fixed logic voltage supply Von on an output terminal 52 thereof. The voltage regulator 60a is always enabled to provide the high input voltage Von to a control means 5 on its input terminal 53. The power supply 50 is also connected to the input terminal 54 of a second voltage regulator 60b, which can provide a logic voltage supply Vcc on its output terminal 55. The voltage regulator 60b can be enabled to provide the logic voltage supply Vcc to the control means 5 on its input terminal 56, when it receives a suitable input voltage (low or high, low in the described embodiment, since the enable terminal is inverted) on its enable terminal 57. This causes the control means 5 to start its logic, which controls the power-on function. The logic is of a conventional type for controlling a touch screen display, also of conventional type, and the function thereof will therefore not be described in more detail. The logic comprises at least one main microprocessor, as well as other control circuits of known technologies.

The way of applying a high input voltage to the enable terminal 57 of regulator 60b, which thereby allows the power supply to be connected to the input terminal 56 of the control means 5, to power-on the mobile phone, will now be described in more detail.

The touch screen display 20 comprises at least two plates, one inner plate 30 and one outer plate 40, which are spaced apart, and connected via four signal lines 31, 32, 41, 42 to the terminals of the control means 5 in a conventional way. The outer plate 40, intended to be depressed by a user, is preferably connected via signal line 41 provided with a pull-up resistor (or pull-down resistor) 19 and the inner plate 30 is connected to ground when the phone is powered down. When the portable phone is powered down, Vcc is low (e.g. 0 V) and Von high (e.g. 5 V). All signals on the output terminals 11–17 of the control means 5 are low. Thus, in this mode, one of the plates 40 has high potential and the other plate 30 has low potential.

When the user depresses a power-on key on the input means 70 provided on the touch screen display 20, the plate 40 that is connected via the pull up resistor 19 will be forced to ground, whereby the signal in signal line 41 will go low. A signal will be sent via signal line 18 to the enable terminal 57 of regulator 60b, which will provide an enabling current, or in other words, a high potential, to the terminal 56 of the control means 5, thereby starting its logic to obtain a power-on function. However, before the logic is started, the control means 5 will start to interpret the meaning of the activation, starting with detecting the touch position, which will be described below.

A control block 80 provided with a comparator function is provided at a touch-screen interface 31, 32, 41, 42. This block 80 is active in power down mode (by Von) and is arranged to perform an initial detection of the pressed position on the touch-screen before a logic voltage supply Vcc is applied to the rest of the logic, as described above.

The control block 80 is in a conventional way either arranged outside the control means 5 and connected thereto or is inside the control means 5. The control block 80 may for instance be transmitting output signals via a signal multiplexing unit 81, which is connected through enable terminal 57 to the voltage regulator 60b to control the logic voltage supply Vcc. To the control means 5, there is also provided a low frequency clock generator (LF clock generator) 82, such as a 32.768 kHz crystal oscillator. In this way conventional clock generator means (not shown), using a much higher frequency, which is very power consuming, can be turned off in power-down mode, even during detecting the pressed position, in order to save power.

This may be of importance, since a very flat touch-screen is easily accessible to inputs made by mistake, which are not intended to start the phone. In prior art phones, such as the one described in SE 9803960-5, the touch screen is normally arranged "deeper".

Preferably, one or more keys 9 of the keypad 70 can be assigned a power-on function by the software of the control means 5.

In this way switching on the portable phone is obtained without requiring any special hardware power-on switch.

According to a preferred embodiment of the invention, the touch screen display comprises a resistive type of touch screen display, but the invention is not limited thereto. The resistive touch screen display comprises two sheets of clear material, which is conducting.

The time period for performing the power-on function will vary depending on application. Thus, the touch screen display must be depressed for a predetermined period of time before performing the power on command. This prevents accidental touching of the power-on button on the touch-screen.

In alternative embodiments, a plurality of power on modes may exist between the full power up and the full power down mode.

Shutting down the portable telephone is performed in a conventional way. One of the keys in the input means 70 can be assigned an "off" function by the software of the control means.

The input means is for instance a movable housing element, such as a flip, comprising a push-through keyboard. It is also possible to use direct activation providing a pressure against the touch screen display, whereby the touch screen display can comprise a user data area divided into multiple sub-areas corresponding to the keys of the keypad.

While the invention has been illustrated by a portable telephone provided with a flip, it is also possible to use other arrangements of keypads, for instance of sliding type.

The voltage regulator 60a which is always enabled to provide a high input voltage to the control means 5 can be substituted by any other switching means, provided that the components in the control means 5 are not destroyed.

The voltage regulator 60b can be substituted by any other voltage-controlled switch.

While the advantages of the invention are most fully realised when no separate hardware switch is used to switch the processor on and off, it is also possible to provide the portable phone with a separate hardware switch if so desired in order to control the power supply to some other component of the portable phone, as well as the processor.

What is claimed is:

1. A portable phone, the portable phone comprising:
    at least one touch screen display, said at least one touch screen display comprising at least one inner and one outer essentially transparent conducting plate, the inner and outer conducting plates being movable in relation to each other between a first position, in which the plates are spaced apart, and a second position, in which the plates substantially contact each other by the outer plate being depressed by a user of the portable phone;
    a single power supply for providing power to the voltage controlled switch and the at least one touch screen display;
    a voltage controlled switch connected to said plates, said voltage controlled switch being adapted to turn on the power of the portable phone upon receipt of a signal indicating that a power-on key or a power-on area has been depressed by the user;
    a control block connected to the voltage controlled switch, the control block being arranged to perform an initial detection and evaluation whether a touch position is a valid pressed position on the touch-screen display before powering-on the phone; and
    wherein the control block is arranged to detect whether the touch position lies within an area defined by four co-ordinates or less defining the maximal area of an on-button of an input-means, or whether the touch position lies within any of the areas of two or more on-buttons or within a combined area of adjoining on-buttons.

2. The portable phone according to claim 1, wherein the control block is arranged to detect whether two sequential touch positions lie within two areas, each defined by four co-ordinates or less defining the maximal area of a corresponding on-button of an input-means.

3. The portable phone according to any one of the preceding claims, wherein the voltage controlled switch comprises control means provided with always-on low frequency (LF) generator means adapted to perform said detection and evaluation.

4. The portable phone according to any one of claim 1–2, wherein the portable phone is a mobile phone.

5. A method for controlling connection of the power supply means in a portable phone provided with a touch screen display, for powering-on the phone, the method comprising the steps of:
    providing user-operable input means, which instructs a voltage controlled switch connected to said touch screen display to turn on the power of the portable phone;
    sensing whether a power-on key of said input means provided on the touch screen display been depressed by a user of the portable phone;
    enabling the voltage controlled switch by a signal originating from said power-on key provided on the touch screen display in order to turn on the power of the portable phone;
    performing, via a control block connected to the voltage controlled switch, an initial detection and evaluation whether touch position is a valid pressed position on the touch-screen display before powering-on the phone; and
    detecting whether the touch position lies within an area defined by four co-ordinates or less defining the maximal area of an on-key of the input-means, or whether the touch position lies within any of the areas of two or more on-keys or within a combined area of adjoining on-keys.

6. The method according to claim 5, comprising the step of detecting whether two sequential touch positions lie within two areas, each defined by four co-ordinates or less defining the maximal area of a corresponding on-key of the input-means.

* * * * *

UNITED STATES PATENT AND TRADEMARK OFFICE
CERTIFICATE OF CORRECTION

PATENT NO.   : 6,901,273 B2
DATED        : May 31, 2005
INVENTOR(S)  : Sturla Lutnaes It is certified that error appears in the above-identified patent and that said Letters Patent is hereby corrected as shown below:

<u>Column 6,</u>
Line 45, please insert -- has -- between "display" and "been".

Signed and Sealed this

Eleventh Day of October, 2005

JON W. DUDAS
*Director of the United States Patent and Trademark Office*